Patented June 28, 1927.

1,633,976

UNITED STATES PATENT OFFICE.

ARTHUR L. BROWN, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE COMPOSITE ARTICLE AND METHOD OF FORMING THE SAME.

No Drawing. Application filed September 24, 1920, Serial No. 412,564. Renewed November 8, 1926.

This invention relates to condensation products, more especially to a product having novel characteristics, and an article formed of such condensation product, and a method of forming the same. More particularly, this invention is directed to phenolic condensation products, especially one which is flexible and absorbs practically no moisture.

Hitherto, in the formation of such products, it was customary to cause a reaction to take place between a phenol and a substance containing an active methylene group, such as formaldehyde, under suitable conditions, to form a soluble, fusible, resinous condensation product which was afterwards treated under heat and pressure to render the same insoluble and hard. When articles were formed with such a condensation product, considerable difficulty in cutting or punching such articles was encountered, due to the fact that the final condensation product was comparatively hard and brittle. This difficulty was pronounced in the case where a fusible phenolic condensation product was used to impregnate sheets of fibrous material which were then formed into composite plates by heat and pressure. When it was attempted to punch such plates at ordinary temperatures into desired form, splitting and tearing of the sheets occurred, resulting in considerable loss of material. If the plates were punched at elevated temperatures, tearing of the material was largely avoided but shrinkage occurred as the material cooled.

I obviate these disadvantages by my invention described herein, it being among the objects thereof to produce a condensation product, particularly of the phenolic type, which is comparatively flexible and which will allow articles formed therewith, such as punch plates, to be readily machined, cut, or punched at ordinary temperatures.

In practicing my invention, I add to the ingredients ordinarily used in making a condensation product, an oil which is capable of becoming polymerized, and then form the condensation product in the usual way. I preferably add to such ingredients a drier, generally in a definite proportion to the oil, so as to catalyze the reaction and form a better product.

A specific instance of the operation of my invention in producing a flexible article is as follows:—

Forty parts by weight of cresol and one part by weight of "tox-tungate solid", (a commercial lead-manganese resinate and tungate, solid drier) are heated together to about 115° C. until the drier is in solution. Ten parts by weight of China wood oil are then added, stirred thoroughly, then thirty parts by weight of a 40% formaldehyde solution are added, and these materials are then raised to 100—110° C. in a suitably covered kettle, provided with some form of condenser to prevent loss of formaldehyde during the heating process.

The temperature is maintained at 100—110° C. until the wood oil has combined with the phenolic condensation product being formed, which time is determined by the fact that when the reaction is complete, none of the wood oil will be seen floating on the surface of the mixture. The compound then consists of two layers, the thick, viscous condensation product on the bottom of the kettle and the weakened formaldehyde solution on top. This reaction ordinarily takes place in about one hour to one hour and a half, dependent on the amount of the ingredients used.

Hot water is then added to the formaldehyde layer, the compound stirred thoroughly, allowed to settle, and the weakened formaldehyde is siphoned off or decanted. The small amount of formaldehyde solution remaining is then boiled out, care being taken not to raise the temperature above 130° C. The solution has been boiled enough when, upon cooling, a very viscous, clear mass is obtained. The material is then thinned with either benzol or a mixture of benzol and denatured alcohol, to the proper consistency for application to paper or other fibrous material.

A sheet of paper is impregnated with the solution of condensation product, the paper then being dried by passing through a heated chamber or through heated rolls. A number of layers of paper are superposed and placed in a mold under a pressure of about 1000 lbs. per sq. in. and heated for several hours at a moderately high temperature, about 120 to 140° C. The finished material may then be cut or punched while cold to any shape desired without any tendency to crack, splinter, tear, or shrink.

I have found, in making my new product, that, if the process is carried out in an iron vessel, the finished article cannot be punched while cold without some tearing, although it can be handled perfectly at about 60° C. I have further found that, if a glass or enameled vessel is used, this difficulty is not encountered. Apparently, the metal of the vessel has an effect on the product which, at the present, is considered undesirable and I, therefore, use a vessel of non-ferrous material, generally of glass or its equivalent, enamel-lined.

I believe that the drier is an important ingredient in my new product since it exerts a catalytic action on the China wood oil, hastening the polymerization thereof. I generally use an amount of drier equal to about 10% of the oil content of the material. Material made by the above-mentioned method is superior to other materials hitherto used in that it is very water-resistant, is flexible, shows no shrinkage after punching, has high mechanical strength, and is not subject to tearing or splitting when punched in the cold.

Although I have described a specific example of the formation of my new product, it is to be understood that my invention is not limited to the details set forth, but various changes may be made therein, as will be understood by those skilled in the art. For instance, instead of adding the drier to cresol and then adding China wood oil and formaldehyde, I may first heat the oil with the drier to a somewhat higher temperature than before, say 175° C., until the drier is completely dissolved. The material may then be cooled to about 150° C., the cresol and then the formaldehyde added and the operation of forming the condensation product continued as above set forth.

In the example given, I have described a condensation product containing 20% of China wood oil, but it is obvious that the proportions may be varied in accordance with the strength and flexibility desired in the finished product, and I generally form products having an oil content of 15 to 25%, although, obviously, wider variations of oil content are feasible. My invention is not limited to the use of cresol or formaldehyde, since the well known equivalents thereof may be used, it being simply necessary to have a material of a phenolic or condensable type and a substance having an active methylene group therein.

Although the specific example of constituents and treatment which I have given mentions "tox-tungate solid" as the drier to be utilized, it is to be understood that any other known drier having suitable qualities may be employed, provided it is soluble in the oil without detrimentally affecting it.

I claim as my invention:—

1. A condensation product comprising a phenolic body, a substance containing a methylene group, a substantial proportion of a polymerizable vegetable oil less than the proportion of said phenolic body, and a drier for catalyzing the condensation reaction.

2. A condensation product comprising a phenolic body, a substance containing a methylene group, a substantial proportion of a polymerizable vegetable oil less than the proportion of said phenolic body, and a drier for catalyzing the condensation reaction.

3. A condensation product comprising a phenolic body, a substance containing a methylene group, a substantial proportion of China wood oil less than the proportion of said phenolic body, and a drier for catalyzing the condensation reaction.

4. A condensation product formed from a mixture comprising a phenolic body, a substance containing an active methylene group, a substantial portion of a polymerizable vegetable oil which is less than the portion of said phenolic body and a drier for catalyzing the condensation reaction, said drier including an inorganic basic radical and an organic radical of high molecular weight.

5. A condensation product comprising a phenolic body, a substance containing a methylene group, a substantial proportion of a polymerizable vegetable oil less than the proportion of said phenolic body, and a lead manganese salt of an organic acid of high molecular weight for catalyzing the condensation reaction.

6. A condensation product comprising a phenolic body, a substance containing a methylene group, a substantial proportion of a polymerizable vegetable oil less than the proportion of said phenolic body, and a "tox tungate" solid for catalyzing the condensation reaction.

7. A hardened condensation product containing 15 to 25% of a polymerized vegetable oil and a drier, the drier being about 10% of the oil.

8. A hardened condensation product containing about 20% of a polymerized vegetable oil.

9. A hardened condensation product containing about 20% of a polymerized vegetable oil and about 2% of drier.

10. A method of forming a condensation product which comprises dissolving a drier in a phenol, adding a polymerizable vegetable oil and then formaldehye, and heating the mixture to complete the reaction.

11. A condensation product formed from a mixture comprising about 49% of a phenolic body, a substantial proportion of a vegetable drying oil less than the proportion of said phenolic body, a drier capable of catalyzing the condensation reaction in the proportion of about 10% of the quantity of said oil and a substance containing a methylene group.

12. A condensation product formed from a mixture comprising about 49% of a phenolic body, 15 to 25% of a vegetable drying oil, a substance containing a methylene group and about 2% of a drier capable of catalyzing the condensation reaction.

13. A condensation product formed from a mixture comprising a phenolic body, 15 to 25% of China wood oil, a substance containing a methylene group and a drier having the catalyzing properties of "tox tungate solid" in the proportion of about 10% of the quantity of said oil.

14. A condensation product formed from a mixture comprising a phenolic body, a substance containing a methylene group, a substantial proportion of a vegetable drying oil less than the proportion of said phenolic body and a drier, said drier including a basic inorganic radical and an organic acid radical of high molecular weight of the class derived from animal and vegetable fats and resinates.

15. A condensation product formed from a mixture comprising a phenolic body, a substance containing a methylene group, a substantial proportion of a vegetable drying oil less than the proportion of said phenolic body and a drier, said drier including a lead-manganese basic radical and an organic acid radical of high molecular weight of the class derived from animal and vegetable fats and resinates.

In testimony whereof, I have hereunto subscribed my name this 17th day of September, 1920.

ARTHUR L. BROWN.